(12) United States Patent
Eriksson et al.

(10) Patent No.: US 12,377,822 B2
(45) Date of Patent: Aug. 5, 2025

(54) METHOD FOR COOLING AN ENDURANCE BRAKING ARRANGEMENT IN AN ELECTRIC VEHICLE

(71) Applicant: Volvo Truck Corporation, Gothenburg (SE)

(72) Inventors: Anders Eriksson, Torslanda (SE); Eskil Sturesson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 438 days.

(21) Appl. No.: 17/841,128

(22) Filed: Jun. 15, 2022

(65) Prior Publication Data
US 2022/0402467 A1  Dec. 22, 2022

(30) Foreign Application Priority Data
Jun. 22, 2021 (EP) .................................... 21180962

(51) Int. Cl.
*B60T 5/00* (2006.01)
*B60T 1/10* (2006.01)
*B60T 7/12* (2006.01)

(52) U.S. Cl.
CPC .................... *B60T 5/00* (2013.01); *B60T 1/10* (2013.01); *B60T 7/12* (2013.01); *B60T 2210/10* (2013.01); *B60T 2210/30* (2013.01)

(58) Field of Classification Search
CPC ..... B60T 5/00; B60T 7/12; B60T 1/10; B60T 2210/10; B60T 2210/30; B60L 58/26;
(Continued)

(56) References Cited

U.S. PATENT DOCUMENTS 10,118,460 B1 * 11/2018 Blatchley ........... B60H 1/00428
2006/0022631 A1 * 2/2006 Marsh ..................... B61C 17/04
318/759
(Continued)

FOREIGN PATENT DOCUMENTS

WO  2008147305 A1  12/2008

OTHER PUBLICATIONS

WO document No. WO 2014/095806 to Morselli published on Jun. 26, 2014.*
(Continued)

*Primary Examiner* — Pamela Rodriguez
(74) *Attorney, Agent, or Firm* — Withrow & Terranova, PLLC (57) ABSTRACT

The present disclosure relates to a method for cooling an endurance braking arrangement of an electric vehicle, the vehicle comprising an electrical power storage device and the endurance braking arrangement, the vehicle comprising a cabin and a fifth wheel for connection of a trailer to the vehicle, the cabin and the fifth wheel being located at an initial distance from each other; wherein the vehicle comprises a cooling system configured to receive cooling air from a position between the cabin and the fifth wheel for cooling the endurance braking arrangement of the vehicle wherein the method comprises arranging the cabin and the fifth wheel such that an increased distance between the cabin and the fifth wheel is obtained as compared to the initial distance for increasing air flow to the cooling system.

20 Claims, 4 Drawing Sheets

(58) Field of Classification Search
CPC ..... B60L 7/10; B60L 7/18; B60L 7/26; B62D 35/001; B62D 53/06
See application file for complete search history.

(56) References Cited

U.S. PATENT DOCUMENTS

| | | |
|---|---|---|
| 2012/0234637 A1* | 9/2012 | Marsh ................. B61C 17/04 188/264 A |
| 2015/0239474 A1 | 8/2015 | Nakamura |
| 2017/0240220 A1* | 8/2017 | Kron ................... B62D 35/001 |
| 2018/0001788 A1 | 1/2018 | Geub et al. |
| 2018/0086227 A1 | 3/2018 | Healy et al. |
| 2018/0236994 A1 | 8/2018 | Healy et al. |
| 2018/0312065 A1 | 11/2018 | Karipidis et al. |
| 2019/0039596 A1 | 2/2019 | Hawley |

OTHER PUBLICATIONS

WO document No. WO 2016/173852 to Ruter published on Nov. 3, 2016.*
German Patent No. DE 102021110899 to Schydlo published on Nov. 3, 2022.*
Korean Patent No. KR 20230166095 to Larsson et al published on Dec. 6, 2023.*
Extended European Search Report for European Patent Application No. 21180962.9, mailed Dec. 20, 2021, 14 pages.

* cited by examiner

METHOD FOR COOLING AN ENDURANCE BRAKING ARRANGEMENT IN AN ELECTRIC VEHICLE

RELATED APPLICATIONS

The present application claims priority to European Patent Application No. 21180962.9, filed on Jun. 22, 2021, and entitled "METHOD FOR COOLING AN ENDURANCE BRAKING ARRANGEMENT IN AN ELECTRIC VEHICLE," which is incorporated herein by reference in its entirety.

FIELD OF THE DISCLOSURE

The present disclosure relates a method for cooling an endurance braking arrangement for an electric vehicle. Also, the disclosure relates to a method for endurance braking an electric vehicle. The disclosure also relates to a system, a computer program, a computer readable medium, and a control unit for implementing the methods, and to an electric vehicle.

BACKGROUND

Braking of vehicles, in particular heavy duty vehicles, in downhill slopes is necessary when performing transport missions. In increased braking demand situations, i.e. where frequent braking during a relatively long period of time is necessary, such as in terrain where there are long and/or frequent downhill slopes, use of the service brakes of the vehicle is generally to be avoided, because of the risk for overheating and/or wear of the service brakes.

Instead, endurance braking is preferred as the method for braking a vehicle in such increased braking demand situations.

For combustion engine vehicles, various endurance braking methods have been developed to deliver sufficient braking power to enable avoiding use of the service brakes in increased braking demand situations.

However, for electric vehicles, the availability of endurance braking is restricted.

Endurance braking in electric vehicles may comprise regenerative endurance braking and energy dissipating endurance braking.

Since the regenerative endurance braking in electric vehicles provides a regenerative braking force while charging the electric power storage device of the vehicle, the capacity for regenerative endurance braking may be dependent on e.g. the charge status of the electric power device. When the electric power device is completely charged or close to completely charged, regenerative endurance braking is no longer available.

Further, the energy dissipating endurance braking, wherein a braking force is provided while dissipating energy, is also restricted due to the risk of overheating the endurance braking arrangement. It may be noted that in combustion engine vehicles, heat dissipated while endurance braking may be removed via the exhaust pipe, a solution which is not available for electric vehicles.

In view of the above, there is a need for alternatives and/or improvements relating to endurance braking arrangements in electric vehicles, in particular as regards increased braking demand situations.

SUMMARY

An object of the invention is to provide an alternative and/or an improvement relating to endurance braking arrangements in electrical vehicles, which may be useful in increased braking demand situations.

The object is achieved by a method for cooling an endurance braking arrangement. Thus, there is provided a method for cooling an endurance braking arrangement of an electric vehicle, the vehicle comprising an electrical power storage device and the endurance braking arrangement. The vehicle further comprises a cabin and a fifth wheel for connection of a trailer to the vehicle, the cabin and the fifth wheel being located at an initial distance from each other. The vehicle comprises a cooling system configured to receive cooling air from a position between the cabin and the fifth wheel for cooling the endurance braking arrangement of the vehicle. The method comprises arranging the cabin and the fifth wheel such that an increased distance between the cabin and the fifth wheel is obtained as compared to the initial distance for increasing air flow to the cooling system as compared to the initial distance.

The step of arranging the cabin and the fifth wheel such that an increased distance between the cabin and the fifth wheel is obtained implies that an air flow of cooling air to the cooling system receiving cooling air from a position between the cabin and the fifth wheel may be increased.

The electrical power storage device may be any electrical power storage device suitable for an electric vehicle. For example, the electrical power storage device may comprise a battery.

The endurance braking arrangement may be arranged to charge the electric power storage device during regenerative endurance braking and to dissipate energy during energy dissipating endurance braking.

Typically, the need for cooling of the endurance braking arrangement is increased during energy dissipating endurance braking.

Optionally, the cooling system comprises a cooling system portion. Such a cooling system portion may comprise a heat exchanger, located between the cabin and the fifth wheel. Thus, the heat exchanger may be arranged to receive cooling air from a position between the cabin and the fifth wheel for cooling the endurance braking arrangement of the vehicle.

Optionally, the step of arranging the cabin and the fifth wheel such that an increased distance between the cabin and the fifth wheel is obtained is performed upon determining a present or upcoming need for cooling of the endurance braking arrangement.

For example, an upcoming need for cooling of the endurance braking arrangement may be assumed in situations which requires endurance braking in such an extent that not only regenerative endurance braking is required, but also energy dissipating endurance braking. For example, this may be the case when the vehicle travels in a terrain involving several and/or long downhill slopes.

Optionally, the method may further comprise the subsequent step of:

arranging the cabin and the fifth wheel such that the initial distance is kept or arrived at upon determining that the increased need for cooling of the endurance braking arrangement no longer prevails. This implies that after the distance between the cabin and the fifth wheel has been increased upon determination of a present or upcoming need for cooling, the initial distance may be re-established upon determining that there is no longer an increased need for cooling.

Optionally, the need for cooling is determined based on the state-of-charge SOC of the electrical power storage device. This implies that the need for cooling may be coupled to the availability of generative endurance braking. Since generative endurance braking implies charging of the electrical power device, a relatively high state-of-charge SOC may indicate that only a limited amount of regenerative endurance braking is available, and that the endurance braking to be performed is energy dissipating endurance braking which might increase the need for cooling.

Optionally, the need for cooling is determined based on the state-of-charge SOC of the electrical power storage device being above a predetermined threshold.

Optionally, the need for cooling is determined based on the determination of current terrain or the estimation of upcoming terrain.

Optionally, the need for cooling is determined based on the determination or estimation of a downhill slope of the terrain of at least a predetermined inclination and/or duration.

Optionally, need for cooling is determined using historical data for increased need for cooling.

For example, historical data may be obtained from the vehicle or from other vehicles, e.g. on the same route.

Optionally, the need for cooling may be determined using static data, for example topographic data.

Optionally, the need for cooling is determined using real-time data, for example current or predicted weather situation data and/or current or predicted traffic situation data and/or current or predicted vehicle weight or load of the electric vehicle and/or configuration data indicative of the configuration of the electric vehicle.

Optionally, the increased distance between the cabin and the fifth wheel is achieved by moving the fifth wheel away from the cabin.

Optionally, the method comprises the step of raising the cabin and/or a chassis of the vehicle for increasing air flow to the cooling system.

This implies that the cabin and/or a chassis of the vehicle may be raised to further increase the air flow to the cooling system and hence to further increase the cooling of the endurance braking arrangement.

The raising of the cabin and/or chassis to increase air flow to the cooling system may be performed upon determining the increased need for cooling of the endurance braking arrangement.

Optionally, the method may comprise lowering the cabin and/or the chassis to decrease air flow to the cooling system upon determining that the increased need for cooling of the endurance braking arrangement no longer prevails.

Optionally, the cabin comprises one or more air deflectors and/or a trailer comprising one or more air deflectors is arranged to the vehicle, the method further comprising the step of controlling the air deflectors of the cabin and/or the air deflectors of the trailer to increase air flow to the cooling system.

This implies that the air deflectors may be used to further increase the air flow to the cooling system and hence to further increase the cooling of the endurance braking arrangement.

The control of the air deflectors to increase are flow to the cooling system may be performed upon determining the increased need for cooling of the endurance braking arrangement.

Optionally, the method may comprise controlling the air deflectors of the cabin and/or the air deflectors of the trailer to decrease air flow to the cooling system upon determining that the increased need for cooling of the endurance braking arrangement no longer prevails.

In a second aspect, the object is achieved by a method for endurance braking an electric vehicle. Thus, there is provided a method for endurance braking an electric vehicle the vehicle comprising an electrical power storage device and the endurance braking arrangement, the vehicle comprising a cabin and a fifth wheel for connection of a trailer to the vehicle, the cabin and the fifth wheel being located at an initial distance from each other; wherein the vehicle comprises a cooling system configured to receive cooling air from a position between the cabin and the fifth wheel for cooling the endurance braking arrangement of the vehicle; the endurance braking arrangement being adapted to provide a regenerative braking force while charging the electric power storage device and/or a energy dissipating braking force provided while dissipating energy from the endurance braking arrangement; the method comprising:

determining a current or upcoming endurance braking need;

performing the method for cooling the endurance braking arrangement of the vehicle in accordance with the first aspect of the present invention in response to determining that the available regenerative braking force is insufficient in view of said current or upcoming endurance braking need.

Optionally the method for endurance braking an electric vehicle may comprise performing the step of determining a current or upcoming endurance braking need;

endurance braking to provide a regenerative braking force while charging the electric power storage device;

performing the method for cooling the endurance braking arrangement of the vehicle in accordance with the first aspect of the present invention in response to determining that the available regenerative braking force is insufficient in view of said current or upcoming endurance braking need, and initiating and/or continuing endurance braking to provide an energy dissipating braking force while dissipating energy from the endurance braking system.

In a third aspect, the object is achieved by a system for endurance braking of an electric vehicle. Thus, there is provided a system for endurance braking of an electric vehicle, the electric vehicle comprising an electrical power storage device, preferably a battery, and an endurance braking arrangement arranged to charge the electric power storage device during regenerative endurance braking, the vehicle comprising a cabin and a fifth wheel for connection of a trailer to the vehicle; and an actuator system enabling at least two different distances to be obtained between the cabin and the fifth wheel; wherein a cooling system configured to receive cooling air for cooling the endurance braking arrangement of the vehicle is arranged between the cabin and the fifth wheel;

the system being adapted to perform a method according to the first or second aspect in the above using the actuator system.

In a fourth aspect, the object is achieved by a computer program. Thus, there is provided a computer program comprising program code means for performing the steps of the method according to the first or second aspect of the invention when the program is run on a computer.

In a fifth aspect, the object is achieved by a computer readable medium. Thus, there is provided a computer readable medium carrying a computer program comprising program code means for performing the steps of the method according to the first of second aspect in the above when the program product is run on a computer.

In a sixth aspect, the object is achieved by a control unit. Thus, there is provided a control unit for controlling an endurance braking arrangement in a vehicle, the control unit being configured to perform the steps of the method according to the first or second aspect in the above.

In a seventh aspect, the object is achieved by an electric vehicle. Thus, there is provided an electric vehicle comprising an electrical power storage device and an endurance braking arrangement arranged to charge the electric power storage device during regenerative endurance braking, the vehicle comprising a cabin and a fifth wheel for connection of a trailer to the vehicle; and an actuator system enabling at least two different distances to be obtained between the cabin and the fifth wheel; wherein a cooling system configured to receive cooling air for cooling the endurance braking arrangement of the vehicle is arranged between the cabin and the fifth wheel; comprising or being operatively connected to a system in accordance with the third aspect in the above.

Features and advantages as described in relation to one of the aspects of the disclosure are equally applicable to the other aspects of the disclosure.

Further, although particularly useful for cooling an endurance braking arrangement in accordance with what is disclosed in the above, the method as disclosed herein may in other applications be used for cooling other vehicle arrangements than an endurance braking arrangement. Such vehicle arrangements could be in an electric vehicle, or in a combustion engine vehicle. Hence, there is provided a method for cooling a vehicle arrangement of a vehicle, the vehicle comprising the vehicle arrangement, the vehicle comprising a cabin and a fifth wheel for connection of a trailer to the vehicle, the cabin and the fifth wheel being located at an initial distance from each other; wherein the vehicle comprises a cooling system configured to receive cooling air from a position between the cabin and the fifth wheel for cooling the vehicle arrangement of the vehicle wherein the method comprises:

arranging the cabin and the fifth wheel such that an increased distance between the cabin and the fifth wheel is obtained as compared to the initial distance for increasing air flow to the cooling system as compared to the initial distance.

Arranging the cabin and the fifth wheel such that an increased distance between the cabin and the fifth wheel is obtained as recited above may be performed in response to the determination of a cooling need by said cooling system exceeding a predetermined cooling need threshold.

Features and advantages as described in relation to the disclosure in the above will be equally applicable to the application of the method for other vehicle arrangements than an endurance braking arrangement.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
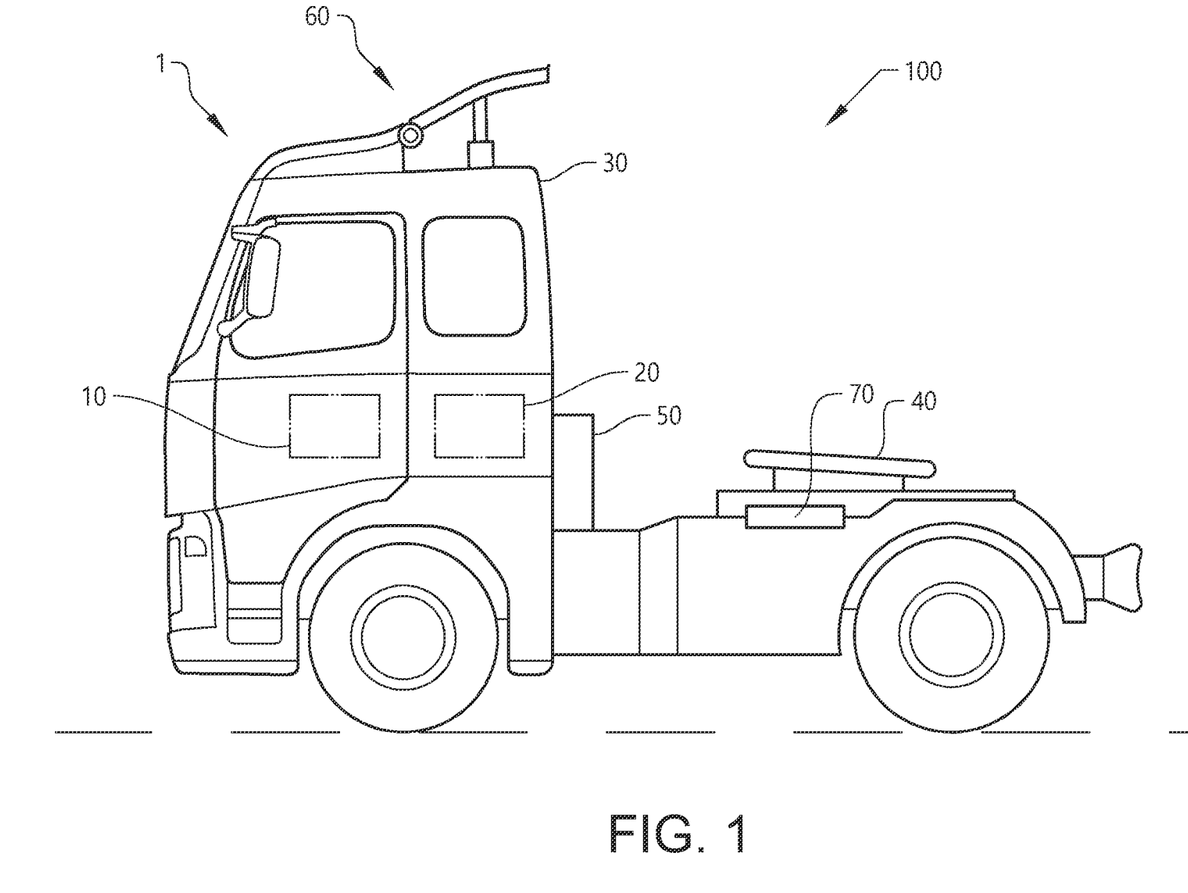
FIG. 1 schematically illustrates a variant of a vehicle as disclosed herein.

FIG. 1 illustrates a variant of an electric vehicle 1 as disclosed herein for which the methods as disclosed herein may be implemented.

The vehicle 1 comprises a cabin 30 and a fifth wheel 40 for connection of a trailer 80 to the vehicle. The illustrated vehicle 1 is a truck. It is understood that the disclosure is not limited to the particular vehicle 1 as illustrated, but could be any kind of vehicle 1 comprising a fifth wheel 40 for connection to any type of trailer 80.

The vehicle 1 comprises an electrical power storage device 20. The electrical power storage device 20 may be any electrical power storage device 20 suitable for a vehicle, for example, the electrical power storage device 20 may comprise one or more fuel cell. In another example, the electrical power storage device 20 may comprise one or more batteries. In another example, the electrical power storage device 20 may comprise one or more fuel cells and one or more batteries. In embodiments of the vehicle 1, the electrical power storage device 20 may comprise at least one unit, such as a battery, being arranged to be charged during operation of the vehicle.

The vehicle 1 further comprises an endurance braking arrangement 10. The endurance braking arrangement 10 may be configured to enable regenerative endurance braking during which the electrical power storage device is charged, and to enable energy dissipating endurance braking during which energy is dissipated, and the electrical power storage device is generally not charged.

The vehicle 1 further comprises cooling system 50 arranged for cooling the endurance braking arrangement 10 of the vehicle. To this end, the cooling system 50 is configured for receiving cooling air from a position between the cabin 30 and the fifth wheel 40.

The cooling system 50 may be any kind of cooling system suitable for receiving cooling air and to use the cooling air for cooling the endurance braking arrangement 10.

To this end, the cooling system 50 may comprise a cooling system portion, located between the cabin 30 and the fifth wheel 40. For example, the cooling system portion may comprise a heat exchanger.

Further, the vehicle 1 may comprise an actuator system 70 enabling at least two different distances to be obtained between the cabin 30 and the fifth wheel 40. For example, the actuator system 70 may be a mechanic actuator system 70 (such as a screw actuator) or the actuator system 70 may be a hydraulic actuator system. Purely by way of example, the actuator system 70 may enable a variation, e.g. a stepped or stepless variation, of the distance between the cabin 30 and the fifth wheel 40.

Also, the vehicle 1 may comprise or be operatively connected to a control unit 100 for controlling the actuator system 70 in accordance with the methods as described herein. The control unit 100 may be comprised in the vehicle, or the control unit may be remote from the vehicle. The control unit 100 may be arranged to receive and/or transmit signals to/from the endurance braking arrangement 10 and/or the actuator system 70. The control unit 100 may be arranged to receive and/or transmit signals via wired or wireless connections.

Figure 2A:
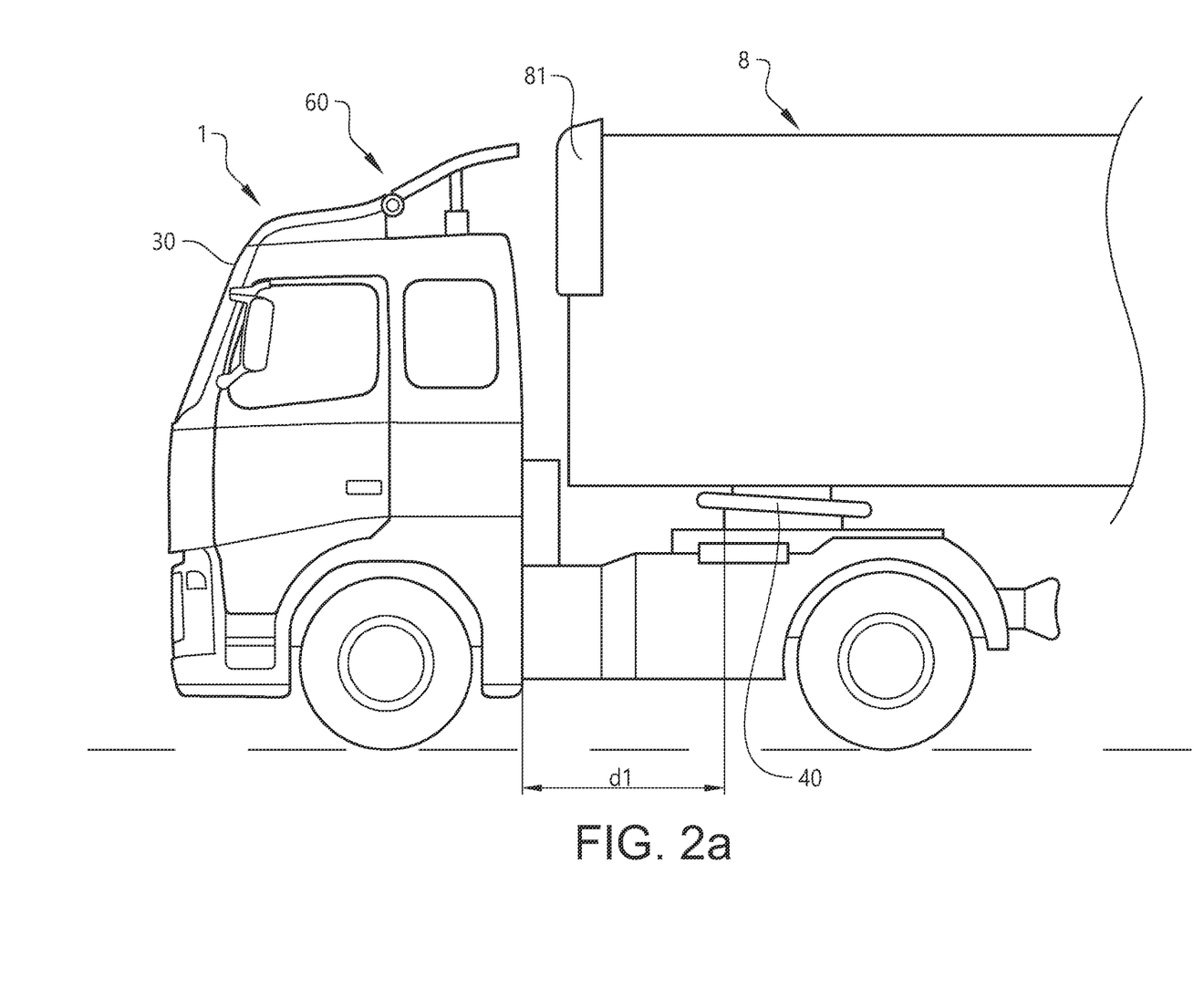
FIGS. 2a and 2b schematically illustrate a variant of a vehicle as disclosed herein, wherein the methods as disclosed herein are implemented.

Turning to FIG. 2a, a vehicle 1 such as the vehicle 1 described in relation to FIG. 1 is illustrated when connected to a trailer 8. In FIG. 2a, the cabin 30 and the fifth wheel 40 are located at an initial distance dl from each other. The initial distance dl may be a standard distance of the vehicle 1, i.e. a distance which is set to be suitable for most situations occurring under operation of the vehicle 1 when connected to a specific trailer 8.

Figure 2B:
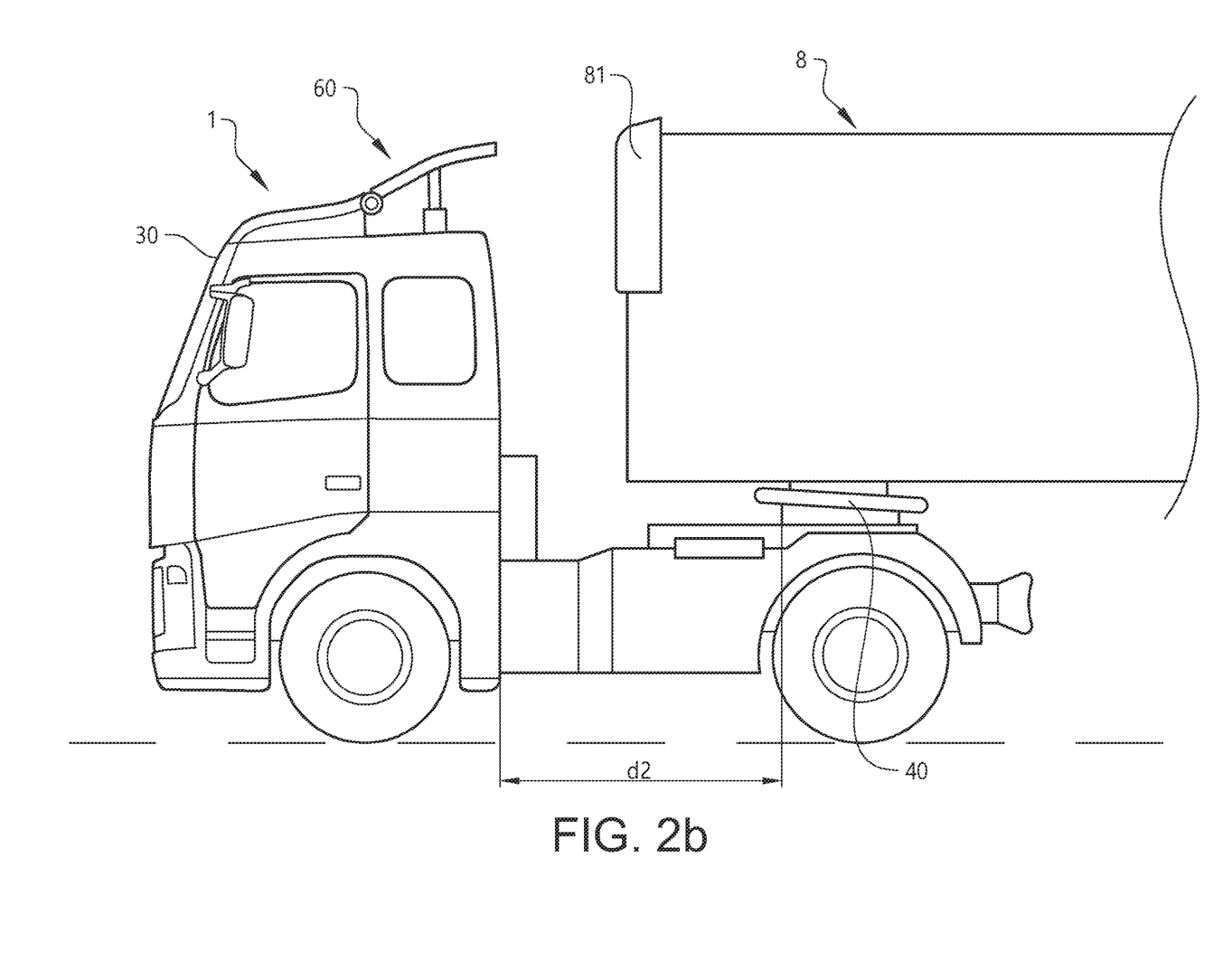

In accordance with a method for cooling the endurance braking arrangement 10 of a vehicle 1 as for example the vehicle 1 illustrated in FIGS. 2a and 2b, a method step 320 is performed comprising:

arranging the cabin 30 and the fifth wheel 40 such that an increased distance d2 between the cabin 30 and the fifth wheel 40 is obtained as compared to the initial distance d1 for increasing air flow to the cooling system 50 as compared to the initial distance d1.

Although the increased distance d2 can be obtained by changing the distance between the cabin 30 and the fifth wheel 40 it is also envisaged that an increased distance between the cabin 30 and the trailer 8 may be obtained in other ways. Purely by way of example, in embodiments of the present invention, the fifth wheel 40 may be such that it allows the distance between the cabin 30 and the trailer 8 to be changed without necessarily moving the position of the fifth wheel 40 relative to the cabin 30. As a non-limiting example, the change of the distance between the cabin 30 and the trailer 8 may be achieved by allowing the fifth wheel 40 two have at least two connection points (not shown) at which the trailer connects to the fifth wheel 40 and the method for changing the distance between the cabin 30 and the trailer 8 may involve moving the connection point for the trailer 8.

FIG. 2b illustrates as an example the vehicle 1 when the method step 320 has been performed, and thus the distance d2 in FIG. 2b is increased as compared to the initial distance d1 of FIG. 2a.

The increased distance d2 between the fifth wheel 40 and the cabin 30 of the vehicle 1 results in an increased distance d2 between the trailer 8 and the cabin 30. Thus the free volume adjacent the position between the cabin 30 and the fifth wheel 40 where the cooling system 50 is configured to receive cooling air is increased, allowing for a greater air flow to the cooling system 50.

With the increased distance d2, the turbulence and/or the air flow adjacent the position between the cabin 30 and the fifth wheel 40 and/or the trailer 8 where the cooling system 50 is configured to receive cooling air may bence be increased, resulting in an increased air flow to the cooling system 50 and increased cooling of the endurance braking arrangement 10.

As exemplified in FIGS. 2a and 2b, the increased distance d2 between the cabin 30 and the fifth wheel 40 is achieved by moving the fifth wheel 40 away from the cabin 30.

For example, the increased distance d2 may be achieved by moving the fifth wheel 40 away from the cabin 30 along a longitudinal axis L of the vehicle corresponding to an intended direction of travel of the vehicle 1. Purely by example, the increased distance d2 may be achieved by moving the fifth wheel 40 away from the cabin 30 along essentially only the longitudinal axis L, i.e. the movement implies that the fifth wheel 40 is moved along a generally horizontal direction while remaining at a constant vertical level, as seen when the vehicle is on horizontal ground.

Figure 3A:
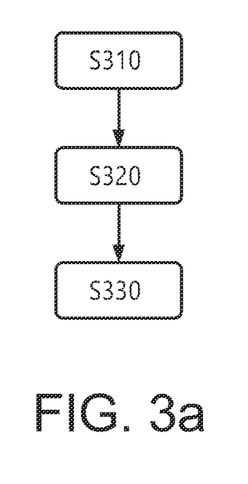
FIG. 3a is a flow chart illustrating a variant of a method for cooling an endurance braking arrangement in a vehicle.
Figure 3B:
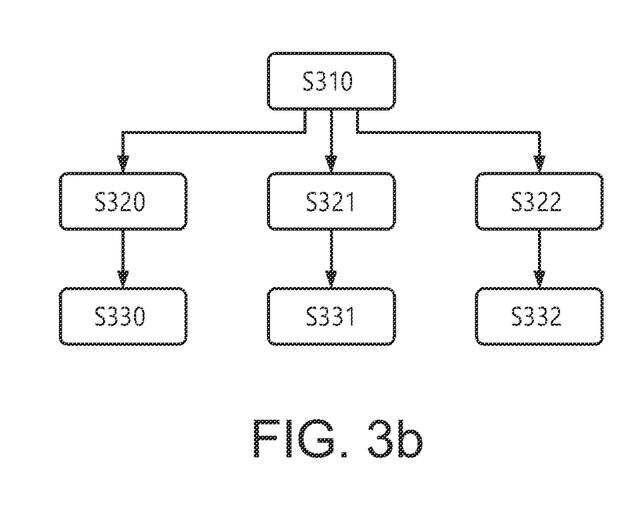
FIG. 3b is a flow chart illustrating another variant of a method for cooling an endurance braking arrangement in a vehicle.

According to some variants, the method may, as in the example flow charts of FIGS. 3a and 3b, comprise a step 310 of determining a present or upcoming need for cooling of the endurance braking arrangement 10. Thus, the step 320 of arranging the cabin 30 and the fifth wheel 40 such that an increased distance d2 between the cabin 30 and the fifth wheel 40 is obtained is performed upon determining, i.e. in response to determining, a present or upcoming need for cooling of the endurance braking arrangement 10 (S310).

Further, according to some variants, the method may, as in the example flow charges of FIGS. 3a and 3b, comprise a subsequent step 5330 of arranging the cabin 30 and the fifth wheel 40 such that the initial distance d1 is kept or arrived at upon determining that the increased need for cooling of the endurance braking arrangement 10 no longer prevails.

For example, the need for cooling may be determined based on the state-of-charge (SOC) of the electrical power storage device 20.

For example, the need for cooling may be determined based on the state-of-charge SOC of the electrical power storage device 20 being above a predetermined threshold. As explained in the above, regenerative endurance braking is in an electrical vehicle generally restricted by the availability of the power storage device 20 to charge to take up braking energy. The predetermined threshold may be set to take the capacity of the power storage device 20 to charge to take up braking energy into account. Hence, purely as an example, the threshold may indicate a completely charged power storage device 20 or a close to completely charged power storage device.

When the power storage device 20 is unable to take up braking energy to charge the battery, endurance braking will be limited to dissipative endurance braking in which the braking energy is dissipated as heat in the endurance braking arrangement. Accordingly, it may be assumed that in this situation, a need for cooling is present.

As an alternative, or in addition to the above, in some variants the need for cooling may be determined based on the determination of current terrain or the estimation of upcoming terrain.

Purely as an example, current or upcoming terrain comprising frequent and/or relatively long downhill slopes may indicate a need for cooling, since such terrain generally requires increased endurance braking demand For example, the need for cooling may be determined based on the determination or estimation of a downhill slope of the terrain of at least a predetermined inclination and/or duration. The predetermined inclination and/or predetermined duration of the downhill slope may be set depending on an estimated need for endurance braking.

As an alternative of in addition, the need for cooling may determined using historical data for increased need for cooling. Historical data may be obtained from the vehicle 1 and/or from other vehicles. Fore example, historical data may be obtained from the vehicle 1 and/or other vehicles travelling the same route.

Optionally, the need for cooling may determined using static data. With static data is meant data which is static at least for a period of time, such as for example topographic data.

Optionally, the need for cooling is determined using real-time data, for example current or predicted weather situation data and/or current or predicted traffic situation data and/or current or predicted vehicle weight or load of the electric vehicle and/or configuration data indicative of the configuration of the electric vehicle.

Static and/or real-time data may be retrieved from onboard or offboard databases and/or controllers.

In some variants, such as the one exemplified in FIG. 3*b*, the method may comprise a step S321 of raising the cabin 30 and/or a chassis of the vehicle 1 for increasing air flow to the cooling system (S321). This implies that the air flow and/or the turbulence adjacent the position between the cabin 30 and the fifth wheel 40 where the cooling system 50 is configured to receive cooling air may be further increased to increase the cooling of the endurance braking system 10.

The step 321 of raising the cabin 20 and/or a chassis of the vehicle 1 may be performed simultaneously with the step 320 of providing an increased distance d2 between the cabin 30 and the fifth wheel 40, as illustrated in the chart of FIG. 3*b*.

Alternatively or in addition, the step 321 of raising the cabin 20 and/or a chassis of the vehicle 1 may be performed before and/or after the step 320 of providing an increased distance d2 between the cabin 30 and the fifth wheel 40.

The step S321 of raising the cabin 30 and/or a chassis of the vehicle 1 for increasing air flow to the cooling system (S321) may be performed upon determining an increased need for cooling of the endurance braking arrangement 10.

Optionally, and as illustrated in FIG. 3*b*, the method may further comprise a step 5331 of lowering the cabin and/or a chassis of the vehicle upon determining that the increased need for cooling no longer prevails.

In some variants, such as the one exemplified in FIG. 3*b*, when the cabin 30 comprises one or more air deflectors 60 (See FIGS. 1 to 2*b*) and/or a trailer 8 comprising one or more air deflectors 81 (See FIGS. 1 to 2*b*) is arranged to the vehicle 1, the method further comprising the step 322 of controlling the air deflectors 60 of the cabin 30 and/or the air deflectors 81 of the trailer 8 to increase air flow to the cooling system 50.

The step 321 step 322 of controlling the air deflectors 60 of the cabin 30 and/or the air deflectors 81 of the trailer 8 to increase air flow to the cooling system 50 may be performed simultaneously with the step 320 of providing an increased distance d2 between the cabin 30 and the fifth wheel 40, as illustrated in the chart of FIG. 3*b*.

Alternatively or in addition, step 322 of controlling the air deflectors 60 of the cabin 30 and/or the air deflectors 81 of the trailer 8 to increase air flow to the cooling system 50 may be performed before and/or after the step 320 of providing an increased distance d2 between the cabin 30 and the fifth wheel 40.

The step 322 of controlling the air deflectors 60 of the cabin 30 and/or the air deflectors 81 of the trailer 8 to increase air flow to the cooling system 50 may be performed upon determining an increased need for cooling of the endurance braking arrangement 10.

Optionally, and as illustrated in FIG. 3*b*, the method may further comprise a step S332 of controlling the air deflectors 60 of the cabin 30 and/or the air deflectors 81 of the trailer 8 to restore a standard position upon determining that the increased need for cooling no longer prevails.

Figure 4:
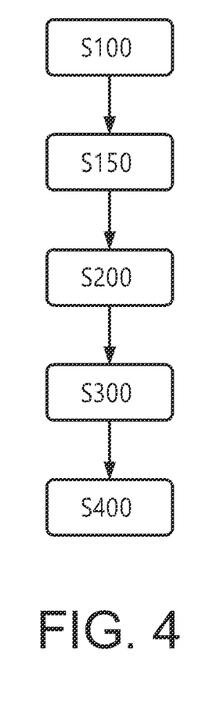
FIG. 4 illustrates a variant of a method for endurance braking a vehicle.

In a second aspect of the disclosure there is provided a method for endurance braking an electric vehicle, using the method for cooling the endurance braking arrangement as described in the above. FIG. 4 is a flow chart of a variant of such a method for endurance braking an electric vehicle 1.

As intimated in the above, the endurance braking arrangement 10 may be adapted to provide a regenerative braking force while charging the electric power storage device 20 and/or a energy dissipating braking force provided while dissipating energy from the endurance braking arrangement 10. The method for endurance braking comprises:
  Determining a current or upcoming endurance braking need S100;
  Determining that the available regenerative braking force is insufficient in view of the current or upcoming endurance braking need S200; and
  Performing the method for cooling the endurance braking arrangement as disclosed in the above S300.

As such, the method for cooling the endurance braking arrangement is carried out in response to determining that the available regenerative braking force is insufficient in view of said current or upcoming endurance braking need in the above method.

Optionally, and as illustrated in FIG. 4, the method for endurance braking an electric vehicle may be comprising:
  Performing the step of determining a current or upcoming endurance braking need S100;
  Endurance braking to provide a regenerative braking force while charging the electric power storage device S150;
  Performing the step of determining that the available regenerative braking force is insufficient in view of the current or upcoming endurance braking need S200;
  Performing the step of performing the method for cooling the endurance braking arrangement, and
  Continuing endurance braking to provide an energy dissipating braking force while dissipating energy from the endurance braking system S400.

Thus, the method for endurance braking an electric vehicle implies that increased cooling of the cooling arrangement 50 is obtained, allowing the endurance braking to continue by providing an energy dissipating braking force while diminishing the risk for overheating the endurance braking arrangement 10.

The disclosure further relates to a control unit 100 for controlling an endurance braking arrangement in a vehicle. As intimated in the above description in relation to FIG. 1, the control unit 100 may be method for cooling an endurance braking arrangement and/or the method for endurance braking an electric vehicle.

Other options and alternatives will be available to the person skilled in the art.

The inventio claimed is:

1. A method for cooling an endurance braking arrangement of an electric vehicle, the electric vehicle comprising:
  an electrical power storage device,
  the endurance braking arrangement,
  a cabin, and
  a fifth wheel for connection of a trailer to the electric vehicle,
  wherein the cabin and the fifth wheel are located at an initial distance from each other,
  wherein the electric vehicle comprises a cooling system configured to receive cooling air from a position between the cabin and the fifth wheel for cooling the endurance braking arrangement of the electric vehicle, and
  wherein the method further comprises:
    arranging the cabin and the fifth wheel such that an increased distance between the cabin and the fifth wheel is obtained as compared to the initial distance for increasing air flow to the cooling system.

2. The method of claim 1, wherein the cooling system comprises a cooling system portion located between the cabin and the fifth wheel.

3. The method of claim 1, wherein the step of arranging the cabin and the fifth wheel, such that an increased distance between the cabin and the fifth wheel is obtained, is performed upon determining a present or upcoming need for cooling of the endurance braking arrangement.

4. The method of claim 3, wherein following the step of arranging the cabin and the fifth wheel such that an increased distance between the cabin and the fifth wheel is obtained, the method further comprising the step of:
arranging the cabin and the fifth wheel such that the initial distance is kept or arrived at upon determining that the increased need for cooling of the endurance braking arrangement no longer prevails.

5. The method of claim 3, wherein the need for cooling is determined based on the state-of-charge of the electrical power storage device, wherein the state-of-charge of the electrical storage device is indicative of an availability of generative endurance braking, such that an endurance braking to be performed is energy dissipating endurance braking.

6. The method of claim 3, wherein the need for cooling is determined based on the state-of-charge of the electrical power storage device being above a predetermined threshold.

7. The method of claim 3, wherein the need for cooling is determined based on the determination of current terrain or the estimation of upcoming terrain, wherein the determination of the current terrain or the estimation of upcoming terrain is indicative of an increased endurance braking demand.

8. The method of claim 3, wherein the need for cooling is determined based on the determination or estimation of a downhill slope of the terrain of at least a predetermined inclination and/or duration, wherein the determination or estimation of a downhill slope of the terrain of at least a predetermined inclination and/or duration is indicative of an increased endurance braking demand.

9. The method of claim 3, wherein the need for cooling is determined using historical data for increased need for cooling, wherein the historical data is obtained from the electric vehicle and/or from other electric vehicles, and is indicative of an increased endurance braking demand.

10. The method of claim 3, wherein the need for cooling is determined using static data, wherein the static data is retrieved from onboard or offboard databases and/or controllers, and is indicative of an increased endurance braking demand.

11. The method of claim 3, wherein the need for cooling is determined using real-time data, the real-time data being current or predicted weather situation data and/or current or predicted traffic situation data and/or current or predicted electric vehicle weight or load of the electric vehicle and/or configuration data indicative of the configuration of the electric vehicle, wherein the real-time data is retrieved from onboard or offboard databases and/or controllers, and is indicative of an increased endurance braking demand.

12. The method of claim 1, wherein the increased distance between the cabin and the fifth wheel is achieved by moving the fifth wheel away from the cabin.

13. The method of claim 1, further comprising the step of raising the cabin and/or a chassis of the electric vehicle for increasing air flow to the cooling system.

14. The method of claim 1, wherein the cabin comprises one or more air deflectors and/or a trailer comprising one or more air deflectors is arranged to the electric vehicle, the method further comprising the step of:
controlling the air deflectors of the cabin and/or the air deflectors of the trailer to increase air flow to the cooling system.

15. The method of claim 1, wherein:
the fifth wheel has at least two connection points by which the trailer connects to the fifth wheel, and
the step of arranging the cabin and the fifth wheel to the increased distance comprises moving the connection between the trailer and the fifth wheel from a first connection point of the at least two connection points to a second point of the at least two connection points.

16. The method of claim 1, wherein:
the electric vehicle further comprises an actuator system enabling at least two different distances to be obtained between the cabin and the fifth wheel, and
the step of arranging the cabin and the fifth wheel is achieved by the actuator system.

17. A method for endurance braking of the electric vehicle, the electric vehicle comprising:
the electrical power storage device,
the endurance braking arrangement,
the cabin, and
the fifth wheel for connection of the trailer to the electric vehicle,
wherein the cabin and the fifth wheel are located at the initial distance from each other,
wherein the electric vehicle comprises the cooling system configured to receive cooling air from the position between the cabin and the fifth wheel for cooling the endurance braking arrangement of the electric vehicle, and
wherein the endurance braking arrangement is adapted to provide a regenerative braking force while charging the electric power storage device and/or an energy dissipating braking force provided while dissipating energy from the endurance braking arrangement,
the method comprising:
determining a current or upcoming endurance braking need, and
performing the method for cooling the endurance braking arrangement of the electric vehicle in accordance with claim 1 in response to determining that the available regenerative braking force is insufficient in view of the current or upcoming endurance braking need.

18. The method of claim 17, the method further comprising:
performing the step of determining the current or upcoming endurance braking need,
endurance braking to provide a regenerative braking force while charging the electric power storage device,
performing the method for cooling the endurance braking arrangement of the electric vehicle in response to determining that the available regenerative braking force is insufficient in view of the current or upcoming endurance braking need, and
initiating and/or continuing endurance braking to provide the energy dissipating braking force while dissipating energy from the endurance braking system.

19. A system for endurance braking of an electric vehicle, the electric vehicle comprising:
an electrical power storage device,
an endurance braking arrangement arranged to charge the electric power storage device during regenerative endurance braking,
a cabin, a fifth wheel for connection of a trailer to the electric vehicle, and an actuator system enabling at least two different distances to be obtained between the cabin and the fifth wheel, wherein a cooling system configured to receive cooling air for cooling the endurance braking arrangement of the electric vehicle is arranged between the cabin and the fifth wheel, and wherein the system is adapted to perform a method for cooling the endurance braking arrangement of the electric vehicle, wherein the cabin and the fifth wheel are located at an initial distance from each other, wherein the method comprises:

using the actuator system, arranging the cabin and the fifth wheel such that an increased distance between the cabin and the fifth wheel is obtained as compared to the initial distance for increasing air flow to the cooling system.

20. An electric vehicle including the system for endurance braking of claim 19.

\* \* \* \* \*